United States Patent
Otsuka

[11] Patent Number: 6,154,697
[45] Date of Patent: Nov. 28, 2000

[54] CONTROL SYSTEM FOR APPARATUS FOR PROTECTING HEAD PORTION OF VEHICLE OCCUPANT

[75] Inventor: Takuya Otsuka, Numazu, Japan

[73] Assignee: Toyota Jidosha Kabushiki Kaisha, Toyota, Japan

[21] Appl. No.: 09/053,621

[22] Filed: Apr. 2, 1998

[30] Foreign Application Priority Data

Apr. 24, 1997 [JP] Japan ................................. 9-107848

[51] Int. Cl.⁷ ................................................. B60R 21/22
[52] U.S. Cl. ............................. 701/45; 701/46; 280/735
[58] Field of Search .................... 701/36, 45, 46, 701/49; 180/268, 271, 282; 280/735, 801.1, 802

[56] References Cited

U.S. PATENT DOCUMENTS

| | | | |
|---|---|---|---|
| 5,029,473 | 7/1991 | Jost et al. ................................. | 280/735 |
| 5,125,472 | 6/1992 | Hara ........................................... | 701/37 |
| 5,135,253 | 8/1992 | Hirashima ............................... | 280/732 |
| 5,144,559 | 9/1992 | Kamimura ............................... | 180/271 |
| 5,428,534 | 6/1995 | Wetzel et al. ............................ | 701/46 |
| 5,461,567 | 10/1995 | Kelley et al. ............................ | 701/45 |
| 5,890,084 | 3/1999 | Halasz et al. ........................... | 701/45 |
| 5,925,084 | 7/1999 | Gotoh et al. ............................. | 701/45 |

FOREIGN PATENT DOCUMENTS

| | | |
|---|---|---|
| 2917687C2 | 9/1985 | Germany . |
| 3815938A1 | 11/1989 | Germany . |
| 3942265A1 | 7/1990 | Germany . |
| 4114992C1 | 8/1992 | Germany . |
| 4214222A1 | 4/1993 | Germany . |
| 4324753A1 | 3/1994 | Germany . |
| 4337949A1 | 5/1994 | Germany . |
| 9416933 | 1/1995 | Germany . |
| 4327022A1 | 2/1995 | Germany . |
| 5-170047 | 7/1993 | Japan . |
| 6-297985 | 10/1994 | Japan . |
| 7-277139 | 10/1995 | Japan . |
| 96/26087 | 8/1996 | WIPO . |

*Primary Examiner*—Tan Nguyen
*Attorney, Agent, or Firm*—Pillsbury Madison & Sutro LLP

[57] ABSTRACT

A control system for an apparatus for protecting a head portion of a vehicle occupant includes: an air bag device having an air bag body for protecting a head portion of a vehicle occupant which air bag body inflates and unfolds between the head portion of the vehicle occupant and a side portion of a vehicle; a pretensioner which, upon operation, takes up slack of a seat belt fastened to the vehicle occupant; a roll angular velocity sensor for detecting a roll rate of the vehicle in order to determine a roll state of the vehicle; and a control circuit which, when a determined roll state is a predetermined roll state, controls operation of the air bag device and operation of the pretensioner such that the pretensioner is operated before operation of the air bag device. Accordingly, a space for unfolding the air bag body of the air bag device is ensured.

12 Claims, 6 Drawing Sheets

F I G. 1
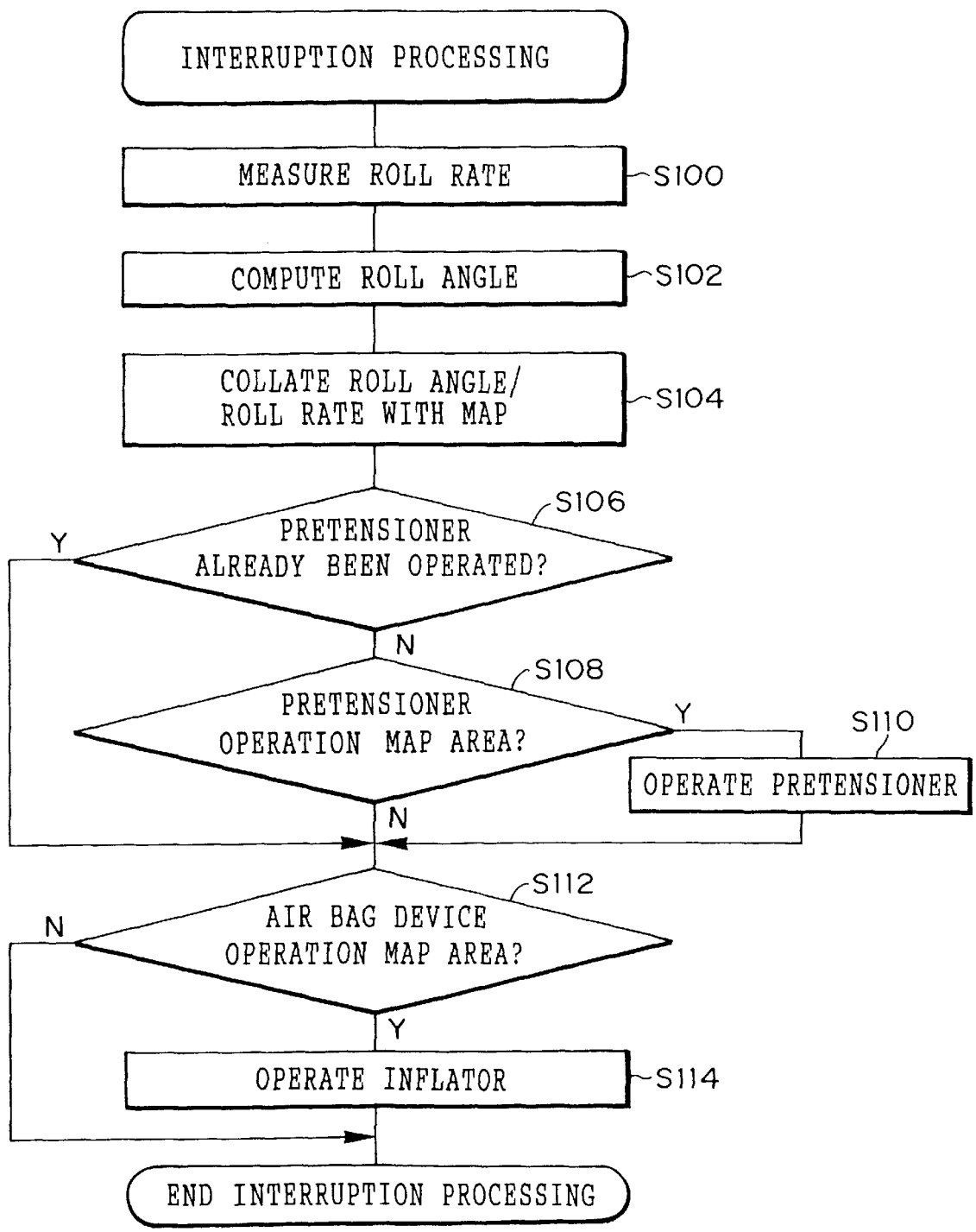

CONTROL SYSTEM FOR APPARATUS FOR PROTECTING HEAD PORTION OF VEHICLE OCCUPANT

BACKGROUND OF THE INVENTION

1. Field of the Invention

The present invention relates to a control system for an apparatus for protecting the head portion of a vehicle occupant which, at the time a predetermined high load is applied to a side portion of a vehicle body, jets gas from an inflator so as to inflate an air bag body in a curtain-like shape from a front pillar portion along a roof side rail portion due to the gas.

2. Description of the Related Art

Control systems for apparatuses for protecting the head portion of a vehicle occupant have been proposed which, in order to improve the vehicle occupant head portion protecting performance at the time when a predetermined high load is applied to a side portion of the vehicle, inflate, in a curtain-like shape and along a window glass, an air bag body which is accommodated in a folded-up state so as to extend from the front pillar portion along the roof side rail portion. The structure described in WO 96/26087, which discloses such a control system for an apparatus for protecting the head portion of a vehicle occupant, will be described hereinafter.

As illustrated in FIG. 6, a vehicle occupant protecting apparatus 100 includes as the main structural components thereof an elongated duct 106, an air bag body 112, an inflator 116, and a belt-like strap 118. The elongated duct 106 is disposed so as to extend from a front pillar portion 102 along the roof side rail portion 104. The air bag body 112 is accommodated within the duct 106 in a folded-up state, and is fixed to the vehicle at a front end fixing point 108 and a rear end fixing point 110. The inflator 116 is connected to the rear end portion of the duct 106 via a hose 114, and jets gas at the time a predetermined high load is applied to a side portion of the vehicle. One end portion of the belt-like strap 118 is fixed to the vehicle, and the other end portion thereof is fixed to the rear end portion of the air bag body 112. The air bag body 112 is formed by connecting a plurality of cells 120 which are each formed in a substantially cylindrical configuration and which are disposed such that the longitudinal directions thereof are substantially the vertical direction of the vehicle.

In accordance with the above-described structure, when a predetermined high load is applied to a side portion of the vehicle, gas is jetted out from the inflator 116. The jetted gas flows, via the hose 114 and the duct 106, into the respective cells 120 of the air bag body 112 which is folded up. As a result, the cells 120 inflate into substantially cylindrical shapes whose longitudinal directions are substantially the vertical direction of the vehicle. The air bag body 112 thereby inflates in a curtain-like shape along a window glass 122. Further, because the rear end portion of the air bag body 112 is connected to the vehicle via the strap 118, the rear end side of the air bag body 112 is reliably disposed at the inner side of the upper portion of a center pillar portion 124.

However, in the above described system for controlling an apparatus for protecting the head portion of a vehicle occupant, the air bag body 112 inflates and unfolds between the head portion of the vehicle occupant and a portion of the vehicle, e.g., the side door glass. Therefore, if the vehicle is turning or a roll is generated at the vehicle or the like, because the vehicle occupant is swung toward the side portion of the vehicle, the gap between the vehicle occupant and the side portion of the vehicle, i.e., the space for the unfolding of the air bag body 112, becomes small.

SUMMARY OF THE INVENTION

In view of the aforementioned, an object of the present invention is to provide a control system for an apparatus for protecting the head portion of a vehicle occupant in which the space for the unfolding of the air bag body is ensured and the air bag body can reliably unfold.

The control system for an apparatus for protecting a head portion of a vehicle occupant of a first aspect of the present invention comprises: an air bag device having an air bag body for protecting a head portion of a vehicle occupant, the air bag body being accommodated so as to extend from a front pillar along a roof side rail and, upon operation, inflating and unfolding between the head portion of the vehicle occupant and a side portion of a vehicle; a pretensioner which, upon operation, takes-up slack of a seat belt fastened to the vehicle occupant; roll state detecting means for detecting a roll state of the vehicle; and control means for, in a case in which a roll state detected by the roll state detecting means is a predetermined roll state, controlling operation of the air bag device and operation of the pretensioner such that the pretensioner is operated before the air bag device is operated.

Accordingly, when the roll state of the vehicle is a predetermined roll state, on the basis of the value detected by the roll state detecting means, the control means operates the pretensioner before operation of the air bag device, i.e., before the head portion protecting air bag body unfolds. As a result, even if a roll is generated at the vehicle, the vehicle occupant can be maintained in the proper seating posture by the seat belt. Therefore, a space for the unfolding of the air bag body can be ensured between the head portion of the vehicle occupant and the side portion of the vehicle, and the air bag body can be reliably unfolded.

In a second aspect of the present invention, in the control system for an apparatus for protecting a head portion of a vehicle occupant of the first aspect, the roll state detecting means is a roll angular velocity sensor which detects, as a roll state of the vehicle, a roll rate which is a rotational angular velocity around a longitudinal axis of the vehicle, and the control means computes a roll angle on the basis of the detected roll rate, and controls the operation of the air bag device and the operation of the pretensioner on the basis of a relationship between the detected roll rate and the computed roll angle.

Accordingly, when the roll state of the vehicle is a predetermined roll state, i.e., when the relationship between the roll rate detected by the roll state detecting means and the roll angle computed at the control means is a predetermined relationship, the control means operates the pretensioner before operation of the air bag device, i.e., before the head portion protecting air bag body unfolds. As a result, even if a roll is generated at the vehicle, the vehicle occupant can be maintained in the proper seating posture by the seat belt. Therefore, a space for the unfolding of the air bag body can be ensured between the head portion of the vehicle occupant and the side portion of the vehicle, and the air bag body can be reliably unfolded.

BRIEF DESCRIPTION OF THE DRAWINGS

FIG. 1 is a flowchart illustrating control of operation of a pretensioner and an air bag device of a control system for an apparatus for protecting the head portion of a vehicle occupant relating to an embodiment of the present invention.

DESCRIPTION OF THE PREFERRED EMBODIMENT

Figure 2:
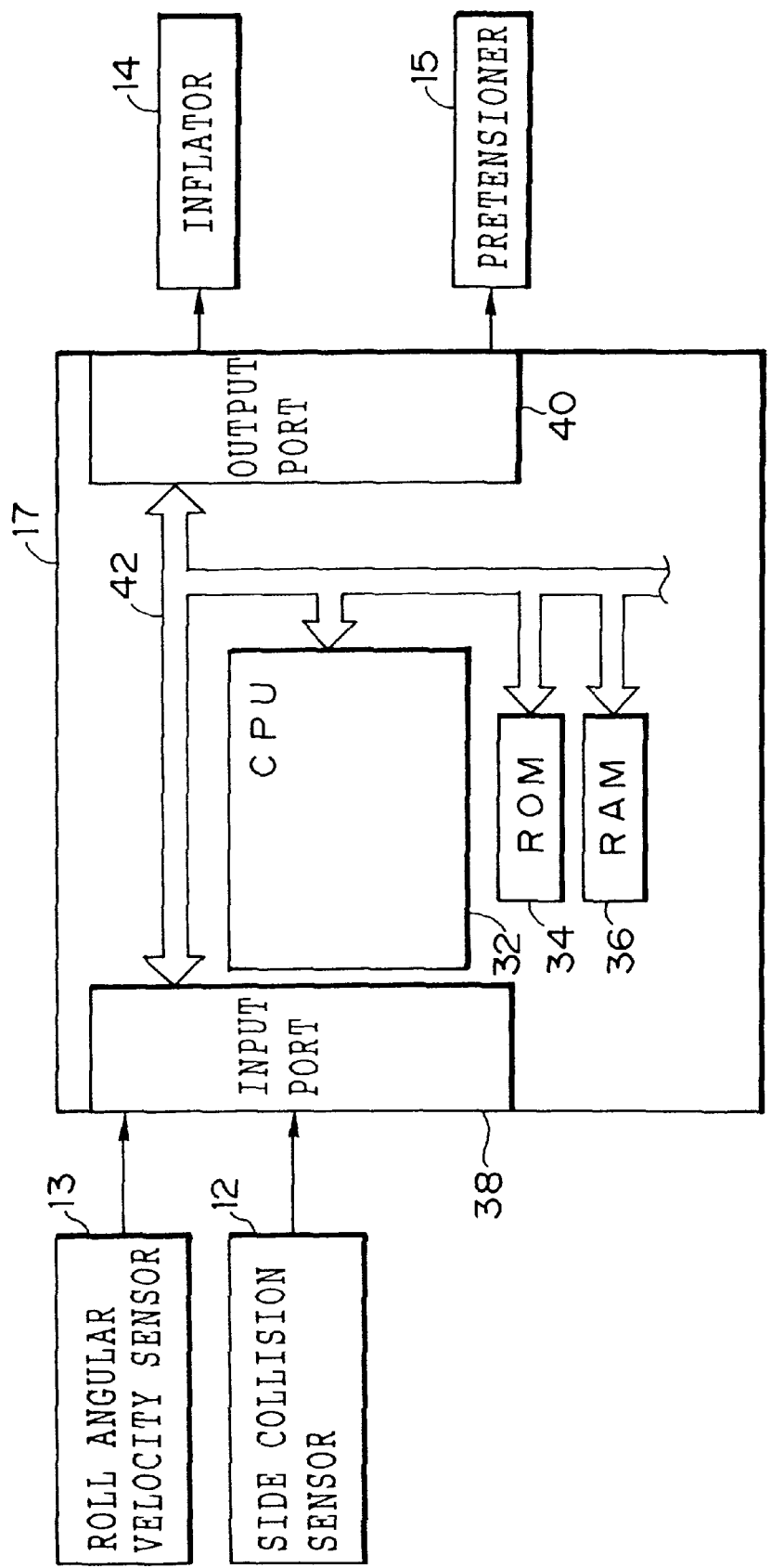
FIG. 2 is a block diagram illustrating the structure of the control system for an apparatus for protecting the head portion of a vehicle occupant relating to the embodiment of the present invention.

An embodiment of the control system for an apparatus for protecting the head portion of a vehicle occupant of the present invention will be described hereinafter in accordance with FIGS. 1 through 5.

In the drawings, arrow FR indicates the frontward direction of the vehicle, and arrow UP indicates the upward direction of the vehicle.

Figure 3:
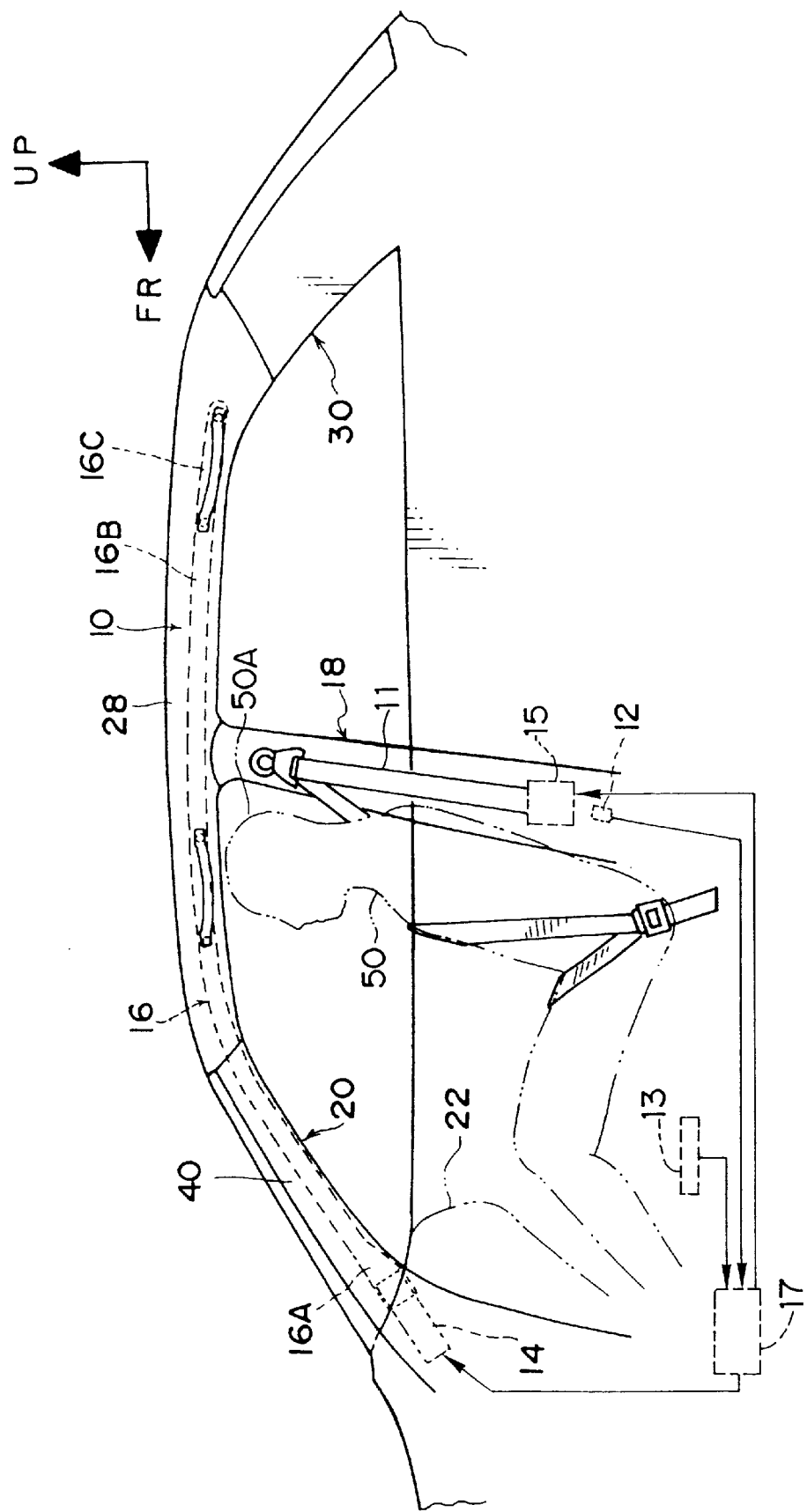
FIG. 3 is a schematic structural view, as seen from the side, of the regions of placement of main portions of the control system for an apparatus for protecting the head portion of a vehicle occupant relating to the embodiment of the present invention.

As illustrated in FIG. 3, the control system for an apparatus for protecting the head portion of a vehicle occupant of the present embodiment is provided with a head portion protecting air bag device 10. The air bag device 10 includes as main structural elements thereof a side collision sensor 12 which detects that there is a side collision, an inflator 14 which jets gas upon operation thereof, an air bag body 16 for protecting a head portion, the air bag body 16 being folded up by a predetermined way of folding, and a control circuit 17 serving as a control means and controlling operation of the inflator 14.

Further, the control system for an apparatus for protecting the head portion of a vehicle occupant of the present embodiment includes a roll angular velocity sensor 13 and a pretensioner 15. The roll angular velocity sensor 13 serves as a roll state detecting means and detects the roll rate which is the rotational angular velocity around the longitudinal axis of the vehicle. The pretensioner 15 takes up the slack of a seat belt 11 upon operation of the pretensioner 15. The operation of the pretensioner 15 is also controlled by the control circuit 17.

The side collision sensor 12 is disposed in a vicinity of a lower end portion of a center pillar (B pillar) 18, and detects that there is a side collision in a case in which a side collision load of a predetermined value or greater is applied to a side portion of the vehicle. For example, a known sensor of a type which detects the rotational angular velocity by using the Coriolis force may be used as the roll angular velocity sensor 13. The average value after rectifying detected voltages is outputted to the control circuit 17 as the roll rate (RR). Further, an acceleration sensor or a gas gyro or the like which detects the force generated by a predetermined mass in accordance with the rotation around the longitudinal axis of the vehicle may be used as the roll angular velocity sensor 13.

The inflator 14 is disposed in a vicinity of a connecting portion of a front pillar (A pillar) 20 and an instrument panel 22, and is connected to the control circuit 17. Accordingly, the inflator 14 is operated by an output signal of the control circuit 17.

Figure 4:
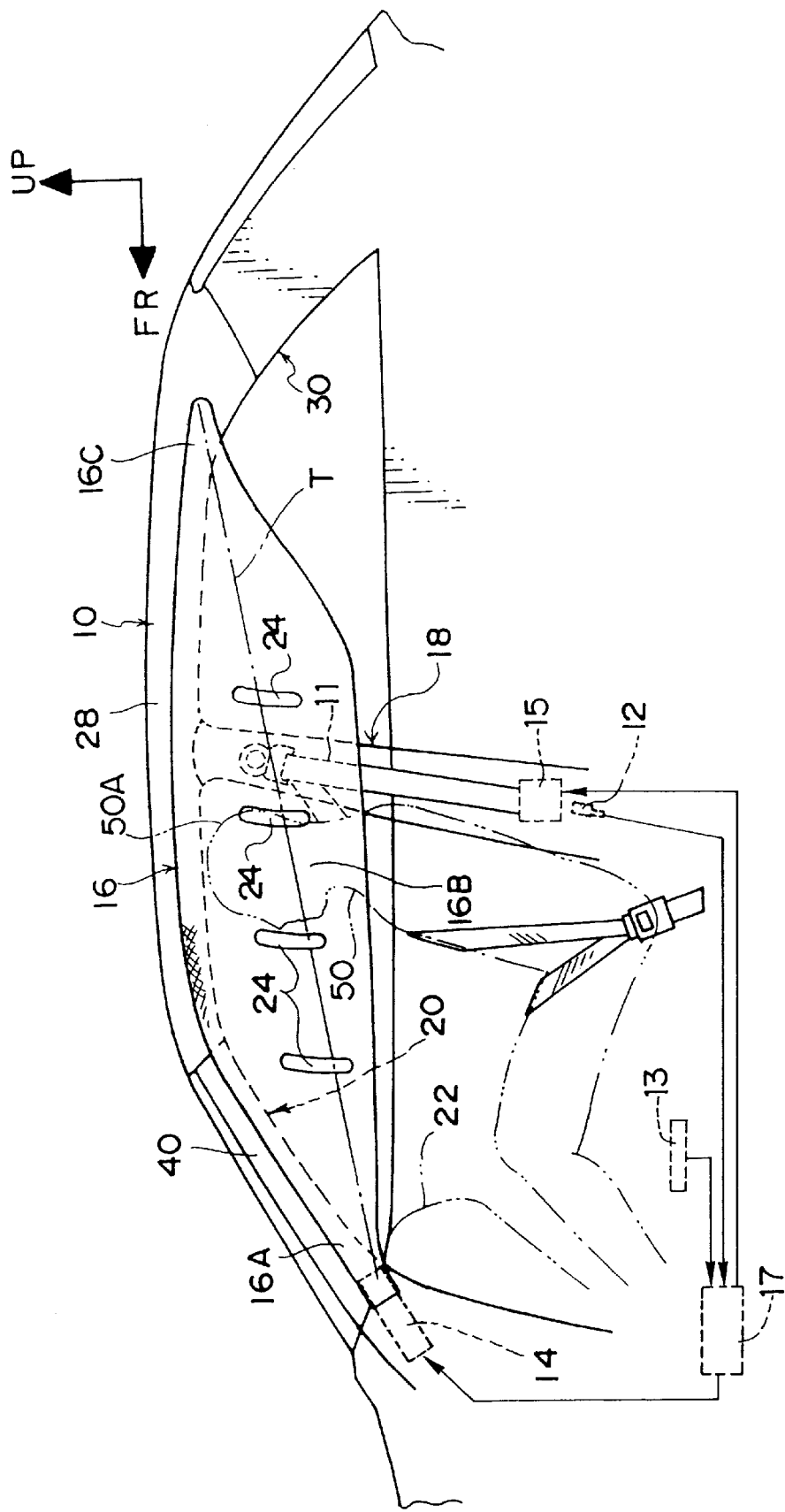
FIG. 4 is a schematic structural view corresponding to FIG. 3 and illustrating a state in which an air bag body is inflated in the control system for an apparatus for protecting the head portion of a vehicle occupant relating to the embodiment of the present invention.

In the unfolded state of FIG. 4, the air bag body 16 is formed as a substantially parallelogram. A plurality of non-inflating portions 24, whose longitudinal directions are the vertical direction of the air bag body and which traverse a tension line T which connects the front end fixing point and the rear end fixing point of the air bag body 16, are formed at predetermined intervals at a vertical direction intermediate portion of the air bag body 16 as seen from the side.

In the accommodated state illustrated in FIG. 3, the air bag body 16 is folded up in accordance with a predetermined folding method into an elongated shape, and is accommodated within a resin case (not illustrated). The air bag body 16 is disposed so as to extend from the front pillar 20 along the roof side rail 28. More specifically, a front end portion 16A of the air bag body 16 is disposed at the position at which the inflator 14 is disposed such that the gas jetted out from the inflator 14 flows into the front end portion 16A of the air bag body 16. An intermediate portion 16B of the air bag body 16 is disposed along the front pillar 20 and the roof side rail 28. A rear end portion 16C of the air bag body 16 is disposed in a vicinity of a quarter pillar (C pillar) 30.

As illustrated in FIG. 2, the control circuit 17 includes a known CPU 32, ROM 34, RAM 36, input port 38, output port 40, and bus 42 which connects these respective portions. The CPU 32 executes a control program stored in the ROM 34.

Next, operation of the present embodiment will be described in accordance with the flowchart illustrated in FIG. 1.

The interruption processing routine illustrated in FIG. 1 for controlling operation of the pretensioner and the air bag device is executed at the control circuit 17 of the control system for an apparatus for protecting the head portion of a vehicle occupant of the present embodiment.

When the present interruption processing routine is executed, first, in step (hereinafter abbreviated as "S") 100, the roll rate RR is read from the roll angular velocity sensor 13, and roll rate measuring processing is carried out. In the roll rate measuring processing, the zero point drift is corrected and the corrected roll rate (RRH) is determined by known computational methods.

Next, in S102, the roll angle (θ) is computed by known integration computation, on the basis of the corrected roll rate (RRH).

Subsequently, a map (see FIG. 5), which shows the relationship between the corrected roll rate (RRH) and the roll angle (θ) is prepared in advance, and is stored in the ROM 34. In S104, the relationship between the corrected roll rate (RRH) determined in S100 and the roll angle (θ) computed in S102 is collated with the map.

Next, in S106, a determination is made as to whether the pretensioner 15 is in a state of already having been operated. When it is determined that the pretensioner 15 is not in a state of having already been operated, in S108, a determination is made as to whether the roll state of the vehicle is in the pretensioner operation area of the map of FIG. 5 (the region R1 illustrated by the lines slanting downward toward the right).

If it is determined in S108 that the roll state of the vehicle is in the pretensioner operation area of the map, in S110, the pretensioner 15 is operated, and the routine proceeds to S112.

Further, in S106, if it is determined that the pretensioner 15 already has been operated, the routine proceeds to S112.

In S112, a determination is made as to whether the roll state of the vehicle is in the map area of operation of the head portion protecting air bag device (the region R2 shown by the lines slanting upward toward the right). If the roll state of the vehicle is in the map area of operation of the head portion protecting air bag device, in S114, the inflator 14 is operated, and the interruption processing routine is completed. In S112, if the roll state of the vehicle is not in the map area of operation of the head portion protecting air bag device, the interruption processing is immediately completed.

Figure 5:
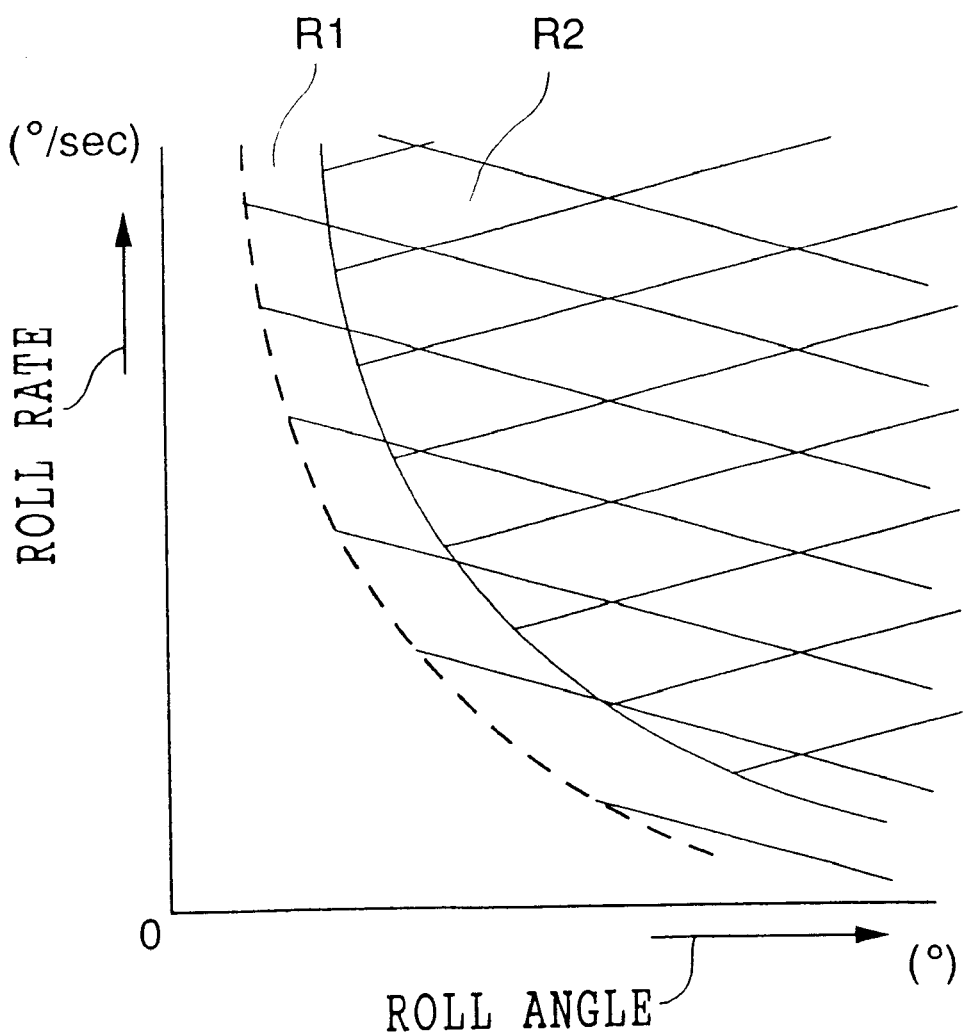
FIG. 5 is a map illustrating the relationship between roll rates and roll angles at the control system for an apparatus for protecting the head portion of a vehicle occupant relating to the embodiment of the present invention.
Figure 6:
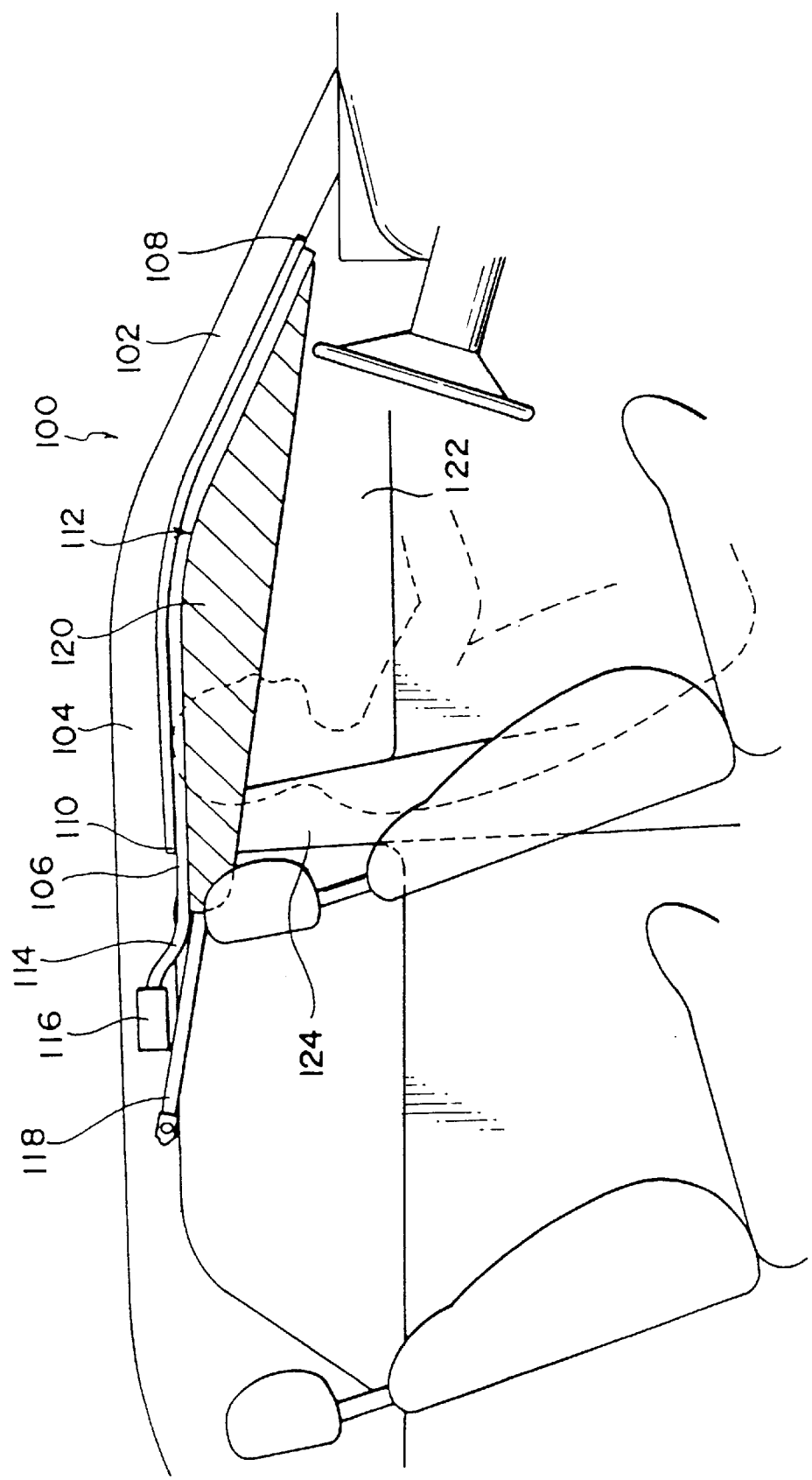
FIG. 6 is a schematic side view illustrating a control system for an apparatus for protecting the head portion of a vehicle occupant relating to a conventional embodiment.

Accordingly, in the present embodiment, when the roll state of the vehicle is a predetermined roll state, i.e., when the relationship between the roll rate and the roll angle is in the map area of operation of the pretensioner (region R1) illustrated in FIG. 5, the control circuit 17 operates the pretensioner 15. Thereafter, when the relationship between the roll rate and the roll angle is in the map area of operation of the head portion protecting air bag device (region R2) shown in FIG. 5, the control circuit 17 operates the inflator 14, and the air bag body 16 unfolds.

As a result, even if the a roll is generated at the vehicle, due to the operation of the pretensioner 15 which precedes the unfolding of the air bag body 16, the slack of the seat belt 11 is taken up, and therefore, the proper seating posutre of a vehicle occupant 50 can be maintained. Accordingly, a space for the unfolding of the air bag body 16 between a head portion 50A of the vehicle occupant 50 and a side poriton of the vehicle, e.g., the side door glass, can be ensured, and the air bag body 16 can reliably unfold.

In the above explanation, a specific embodiment of the present invention was described in detail. However, the presnet invention is not limited to this embodiment, and it should be clear to those skilled in the art that other types of embodiments are possible within the scope of the invention. For example, a seat belt sensor which detects whether a seat belt has been fastened, or a seating sensor which detects whether there is a vehicle occupant seated, or the like may be provided, and the operation of the pretensioner and the inflator may be controlled in consideration of the results of detection of such sensors as well. Further, the computation of the roll rate and the roll angle are not limited to those of the present embodiment, and the roll rate and the roll angle may be computed by other computations, for example, may be computed from the roll angular velocity.

What is claimed is:

1. A control system for an apparatus for protecting a head portion of a vehicle occupant, the control system comprising:

an air bag device having an air bag body for protecting the head portion of the occupant, the air bag body being (i) configured to extend from a front pillar along a roof side rail of a vehicle and, (ii) adapted to inflate and unfold between the head portion of the occupant and a side portion of the vehicle;

a pretensioner adapted to remove slack from a seat belt fastened to the occupant;

roll state detecting means for detecting a roll state of the vehicle, the roll state including a roll rate and a roll angle; and control means for controlling operation of said air bag device and operation of said pretensioner when the roll state is a predetermined roll state value, said pretensioner being operated before said air bag device is operated;

wherein said control means (i) includes a map correlating roll rates to roll angles and (ii) controls operation of said airbag device and operation of said pretensioner in accordance with the map.

2. A control system for an apparatus for protecting a head portion of a vehicle occupant according to claim 1, wherein said control means judges whether said pretensioner has already been operated, and in a case in which said pretensioner has not yet been operated, said control means operates said pretensioner before said air bag device is operated.

3. A control system for an apparatus for protecting a head portion of a vehicle occupant according to claim 2, wherein said roll state detecting means is a roll angular velocity sensor which detects, as a roll state of the vehicle, a roll rate which is a rotational angular velocity around a longitudinal axis of the vehicle, and said control means computes a roll angle on the basis of the detected roll rate, and controls the operation of said air bag device and the operation of said pretensioner on the basis of a relationship between the detected roll rate and the computed roll angle.

4. A control system for an apparatus for protecting a head portion of a vehicle occupant according to claim 3, wherein said control means includes a storage means for storing a map which is prepared in advance and which shows relationships between roll rates and roll angles, and said control means controls the operation of said air bag device and the operation of said pretensioner by collating the relationship between the detected roll rate and the computed roll angle with the map.

5. A control system for an apparatus for protecting a head portion of a vehicle occupant according to claim 1, wherein said roll state detecting means is a roll angular velocity sensor which detects, as a roll state of the vehicle, a roll rate which is a rotational angular velocity around a longitudinal axis of the vehicle, and said control means computes a roll angle on the basis of the detected roll rate, and controls the operation of said air bag device and the operation of said pretensioner on the basis of a relationship between the detected roll rate and the computed roll angle.

6. A control system for an apparatus for protecting a head portion of a vehicle occupant according to claim 5, wherein said control means includes a storage means for storing a map which is prepared in advance and which shows relationships between roll rates and roll angles, and said control means controls the operation of said air bag device and the operation of said pretensioner by collating the relationship between the detected roll rate and the computed roll angle with the map.

7. A control system for an apparatus for protecting a head portion of a vehicle occupant, the control system comprising:

an air bag device having an air bag body for protecting the head portion of the occupant, the air bag body being (i) configured to extend from a front pillar along a roof side rail of a vehicle and, (ii) adapted to inflate and unfold between the head portion of the occupant and a side portion of the vehicle;

a pretensioner adapted to remove slack from a seat belt fastened to the occupant;

roll state detecting means for detecting a roll state of the vehicle, the roll state including a roll rate and a roll angle; and control means for (i) determining whether said pretensioner has already been operated, when the roll state is a predetermined roll state value, and (ii) controlling operation of said pretensioner and operation of said air bag device when said pretensioner has not been operated, said pretensioner being operated before said air bag device is operated;

wherein said control means (i) includes a map correlating roll rates to roll angles and (ii) controls operation of said airbag device and operation of said pretensioner in accordance with the map.

8. A control system for an apparatus for protecting a head portion of a vehicle occupant according to claim 7, wherein said roll state detecting means is a roll angular velocity sensor which detects, as a roll state of the vehicle, a roll rate which is a rotational angular velocity around a longitudinal axis of the vehicle, and said control means computes a roll angle on the basis of the detected roll rate, and controls the operation of said air bag device and the operation of said pretensioner on the basis of a relationship between the detected roll rate and the computed roll angle.

9. A control system for an apparatus for protecting a head portion of a vehicle occupant according to claim 8, wherein said control means includes a storage means for storing a map which is prepared in advance and which shows relationships between roll rates and roll angles, and said control means controls the operation of said air bag device and the operation of said pretensioner by collating the relationship between the detected roll rate and the computed roll angle with the map.

10. A control system for an apparatus for protecting a head portion of a vehicle occupant, the control system comprising:

an air bag device having an air bag body for protecting the head portion of the occupant, the air bag body being (i) configured to extend from a front pillar along a roof side rail of a vehicle and, (ii) adapted to inflate and unfold between the head portion of the occupant and a side portion of the vehicle;

a pretensioner adapted to remove slack from a seat belt fastened to the occupant;

roll state detecting means for detecting a roll state of the vehicle, the roll state including a roll rate and a roll angle; and control means for (i) controlling operation of said pretensioner when the roll state is a first roll state value and (ii) controlling operation of said air bag device when the roll state is a second roll state value;

wherein said first roll state and said second roll state values are predetermined to operate said pretensioner before operating said air bag device.

11. A control system according to claim 10, wherein said control means includes a map correlating roll rates to roll angles, said first roll state value is one predetermined region in the map, and said second roll state value is another predetermined region in the map.

12. A control system for an apparatus comprising:

an air bag device having an air bag body for protecting a head portion of a vehicle occupant;

a pretensioner adapted to remove slack from a seat belt fastened to the occupant;

roll state detecting means for detecting a roll state of a vehicle, the roll state including a roll rate and a roll angle; and control means for (i) controlling operation of the pretensioner when the roll state is a first roll state value and (ii) controlling operation of the air bag device when the roll state is a second roll state value.

* * * * *